US008135662B2

(12) United States Patent
Bollen et al.

(10) Patent No.: US 8,135,662 B2
(45) Date of Patent: Mar. 13, 2012

(54) USAGE BASED INDICATORS TO ASSESS THE IMPACT OF SCHOLARLY WORKS: ARCHITECTURE AND METHOD

(75) Inventors: Johan Bollen, Santa Fe, NM (US); Herbert Van De Sompel, Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 131 days.

(21) Appl. No.: 11/431,409

(22) Filed: May 9, 2006

(65) Prior Publication Data

US 2007/0266144 A1      Nov. 15, 2007

(51) Int. Cl.
*G06F 15/00* (2006.01)
*G06F 15/18* (2006.01)
(52) U.S. Cl. .............. 706/62; 706/45; 706/46; 707/705; 707/727
(58) Field of Classification Search ............... 706/45–47; 707/1–3, E17.008
See application file for complete search history.

(56) References Cited

U.S. PATENT DOCUMENTS

| | | | | | |
|---|---|---|---|---|---|
| 5,594,897 | A | * | 1/1997 | Goffman | 707/102 |
| 5,870,770 | A | * | 2/1999 | Wolfe | 715/805 |
| 6,038,574 | A | * | 3/2000 | Pitkow et al. | 715/210 |
| 6,182,091 | B1 | * | 1/2001 | Pitkow et al. | 715/206 |
| 6,738,780 | B2 | * | 5/2004 | Lawrence et al. | 707/101 |
| 2002/0169762 | A1 | * | 11/2002 | Cardona | 707/3 |
| 2006/0271859 | A1 | * | 11/2006 | Gorzela | 715/738 |

OTHER PUBLICATIONS

Bollen et al., "Usage Analysis for the Identification of Research Trends in Digital Libraries", D-Lib Magazine; May 2003, pp. 1-20.*
Sompel et al. "Using the OAI-PMH ... differently", D-Lib Magazine, Jul./Aug. 2003, pp. 1-21.*
Bollen et al., "Toward Alternative MEtrics of Journal Impact: A Comparisson of Download and Citation Data", 2005, pp. 1419-1440.*
Bekaert et al. "Access Interfaces for Open Archival Information Systems Based on the OAI-PMH and the OpenURL Framework for Context-Sensitive Services", 2005, 31 pages.*
Wilson, "Open URL: Linking Through the Maze of Online Resources", 2004, pp. 1-10.*
Jerez et al. "The Multi-Faceted Use of the OAI-PMH in the LANL Repository", JCDL, 2004, pp. 11-20.*
Van de Sompel et al. "A distributed Registry for OpenURL Metadata Schemas with an OAI-PMH Conformant Central Repository" ICPPW, 2002, 4 pages.*
Bollen et al. "The BX Project: Federating and Mining Usage Logs from Linking Servers", CNI, Dec. 2005, 42 pages.*

(Continued)

*Primary Examiner* — Omar Fernandez Rivas
(74) *Attorney, Agent, or Firm* — John P. O'Banion; Meredith H. Schoenfeld

(57) ABSTRACT

Although recording of usage data is common in scholarly information services, its exploitation for the creation of value-added services remains limited due to concerns regarding, among others, user privacy, data validity, and the lack of accepted standards for the representation, sharing and aggregation of usage data. A technical, standards-based architecture for sharing usage information is presented. In this architecture, OpenURL-compliant linking servers aggregate usage information of a specific user community as it navigates the distributed information environment that it has access to. This usage information is made OAI-PMH harvestable so that usage information exposed by many linking servers can be aggregated to facilitate the creation of value-added services with a reach beyond that of a single community or a single information service.

5 Claims, 8 Drawing Sheets

OTHER PUBLICATIONS

J. Bollen et al. Toward alternative metrics of journal impact: A comparison of download and citation data. Information Processing and Management, Special Issue on Infometrics, vol. 41, No. 6, pp. 1419-1440 (2005).

J. Bollen et al. Usage analysis for the identification of research trends in digital libraries. D-Lib Magazine, vol. 9, No. 5 (2003).

J. Bollen et al. Evaluation of digital library impact and user communities by analysis of usage patterns. D-Lib Magazine, vol. 8, No. 6 (2002).

J. Bollen et al. Mining associative relations from website logs and their application to context-dependent retrieval using spreading activation. Proceedings of the Workshop on Organizing Webspaces (ACM-DL99), Berkeley, CA (1999).

M.J. Kurtz et al. Worldwide use and impact of the NASA astrophysics data system digital library. JASIST, vol. 56, No. 1, pp. 36-45 (2004).

T. Opthof. Sense and nonsense about the impact factor. Cardiovascular Research, vol. 33, pp. 1-7 (1997).

J. Reedjik. Sense and nonsense of science citation analyses: comments on the monopoly position of ISI and citation inaccuracies. Risks of possible misuse and biased citation and impact data. New J. Chem., pp. 767-770 (1998).

H. Van De Sompel et al. Using the OAI-PMH . . . differently. D-Lib Magazine, vol. 9, No. 7/8 (2003).

H. Van De Sompel et al. The UPS prototype: An experimental end-user service across e-print archives. D-Lib Magazine, vol. 6, No. 2 (2000).

H. Van De Sompel et al. Reference linking in a hybrid library environment: Part 3: Generalizing the SFX solution in the "SFX@Ghent & SFX@LANL" experiment. D-Lib Magazine, vol. 5, No. 10 (1999).

* cited by examiner

USAGE BASED INDICATORS TO ASSESS THE IMPACT OF SCHOLARLY WORKS: ARCHITECTURE AND METHOD

STATEMENT REGARDING FEDERALLY SPONSORED RESEARCH OR DEVELOPMENT

This invention was made with government support under Contract No. DE-AC52-06NA25396 awarded by the U.S. Department of Energy. The Government has certain rights in this invention.

CROSS-REFERENCE TO RELATED APPLICATIONS

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to assessing the impact of scholarly works (references), and more particularly to the development of a network of usage information and the application of social network metrics to the network to determine the relative impact of a scholarly work.

2. Description of Related Art

The growing body of research literature necessitates a way to organize and manage the information to make it accessible to those seeking it. Various indexes have been developed, including title indexes, title word indexes, keyword indexes, subject indexes, and, finally, citation indexes.

Citation indexes and databases were developed for researchers to find out what other researchers were interested in their work and who was using various available methodologies. Citation indexing has lead to development of various tools, which are used to rank the prestige of journals, publications, institutes, universities, and authors. The concept of journal impact $I_g$ can be measured and represented in a number of different ways. The most prevalent index is the Institute of Scientific Information's Impact Factor (ISI IF), which has been in use for at least 40 years.

The ISI IF represents journal impact as the ratio between the number of citations to articles published in a journal over a 2 year period, divided by the total number of citeable articles published in that same period. It expresses the impact or quality of a journal in terms of the degree to which its articles are cited in the literature.

Regardless of the set of assumptions about what motivates authors to cite that underlie the ISI IF, and the issues that arise when it is being applied in a range of domains, the ISI IF as an operationalization of $I_g$ can be characterized by three main features:

(1) It is based on a frequentist metric: journal impact is largely determined by counting the number of citations to a journal. Each citation is counted as a vote of confidence for the particular journal, and a citation count amounts essentially to a poll of experts (authors) on the impact of a journal.

(2) It is based on a selection made by the ISI of all published journals.

(3) It is determined from citation frequencies as they occur for a global, nonspecific community of authors.

First, by its focus on citation frequencies the ISI IF focuses on a highly particular aspect of $I_g$, thereby ignoring more contextual indications of journal impact. For example, do journals which receive citations mostly from high impact journals also have high impact in spite of a relatively low absolute citation count? Does a journal that contains a high number of out-going citations function as a "hub" in the citation graph and thereby have higher impact than the number of its in-coming citations alone would indicate? Does a journal whose articles critically connect different scientific domains have high impact? These examples pertain to structural features of impact which a frequentist metric of $I_g$, such as the ISI IF, does not express.

Second, the ISI IF is calculated on the basis of citation frequencies which have been registered for an ISI-defined set of selected scholarly journals. This core set of journals does not include a majority of the growing body of web-based publications, gray literature, and multimedia collections.

Finally, the ISI IF is based on the journal citation patterns of a global community of authors (an author generated network (AGN)). It thus represents a global, consensus view of journal impact. Local author and reader communities can, however, have strongly diverging views. Therefore the ISI IF, as a "global" metric of impact, cannot provide an accurate assessment of the degree to which a particular Digital Library's collection fits the needs of its local community.

BRIEF SUMMARY OF THE INVENTION

The instant invention is directed to a system and method for evaluating the impact of a reference work, such as a journal or an individual article. Data relating to the usage of the reference are merged together from various Digital Libraries, and these data are used to create a representation (network) of the relationships between various scholarly works. The relationships shown on the resulting network are analyzed using social network metrics to determine the impact of the particular work on other works, in a particular field or within a particular community of users.

An aspect of the invention is a method of analyzing usage information for a reference collection, comprising aggregating usage information to produce a superlog; deriving a network representation of said superlog; and computing network metrics based on said network representation; wherein a result is obtained for any single item in the reference collection, any groups of items in the reference collection, and the reference collection as a whole.

In another embodiment, the network metrics provide indicators of impact of components of said network representation.

In another embodiment, the network representation comprises a plurality of nodes; and each node represents a reference. Another embodiment of the network representation further comprises connections between the nodes based on usage, with connections represented as edges between the nodes. In a further embodiment, edges between said nodes are weighted edges, the weighted edge representing frequency of co-retrieval of references represented by the nodes.

In another embodiment, the weighted edges are generated using a data mining technique. In a further embodiment, the data mining technique is the Retrieval Coherence Assumption.

In another embodiment, the network metrics comprise social network metrics. In yet another embodiment, the social network metrics provide indicators of status of the nodes in the network representation. Another embodiment provides that the indicators comprise degree centrality of a node, closeness centrality of a node, and betweenness centrality of a node.

In another embodiment, the usage information is obtained in an XML format. In yet another embodiment, the aggregating step is performed using the OAI-PMH protocol.

Another aspect of the invention is an add-on for a linking server, comprising a special purpose log database; at least one linking server; wherein each said linking server comprises a log repository; the log repository comprising usage data; means for harvesting usage data from a plurality of linking servers; and means for merging all said usage data into said special purpose log database.

One embodiment comprises means for creating a network representation of relationships expressed in the usage data in the special purpose log database.

Another embodiment further comprises means for applying network metrics to the network representation; wherein the network metrics produce indicators of impact of reference works based on the usage data. Still another embodiment provides that the network metrics are social network metrics A still further aspect of the invention is a rating factor for a reference, comprising a representation of usage of the reference; wherein said representation is determined using social network metrics Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 8. It will be appreciated that the apparatus may vary as to configuration and as to details of the parts, and that the method may vary as to the specific steps and sequence, without departing from the basic concepts as disclosed herein.

1. Approach

Figure 1:
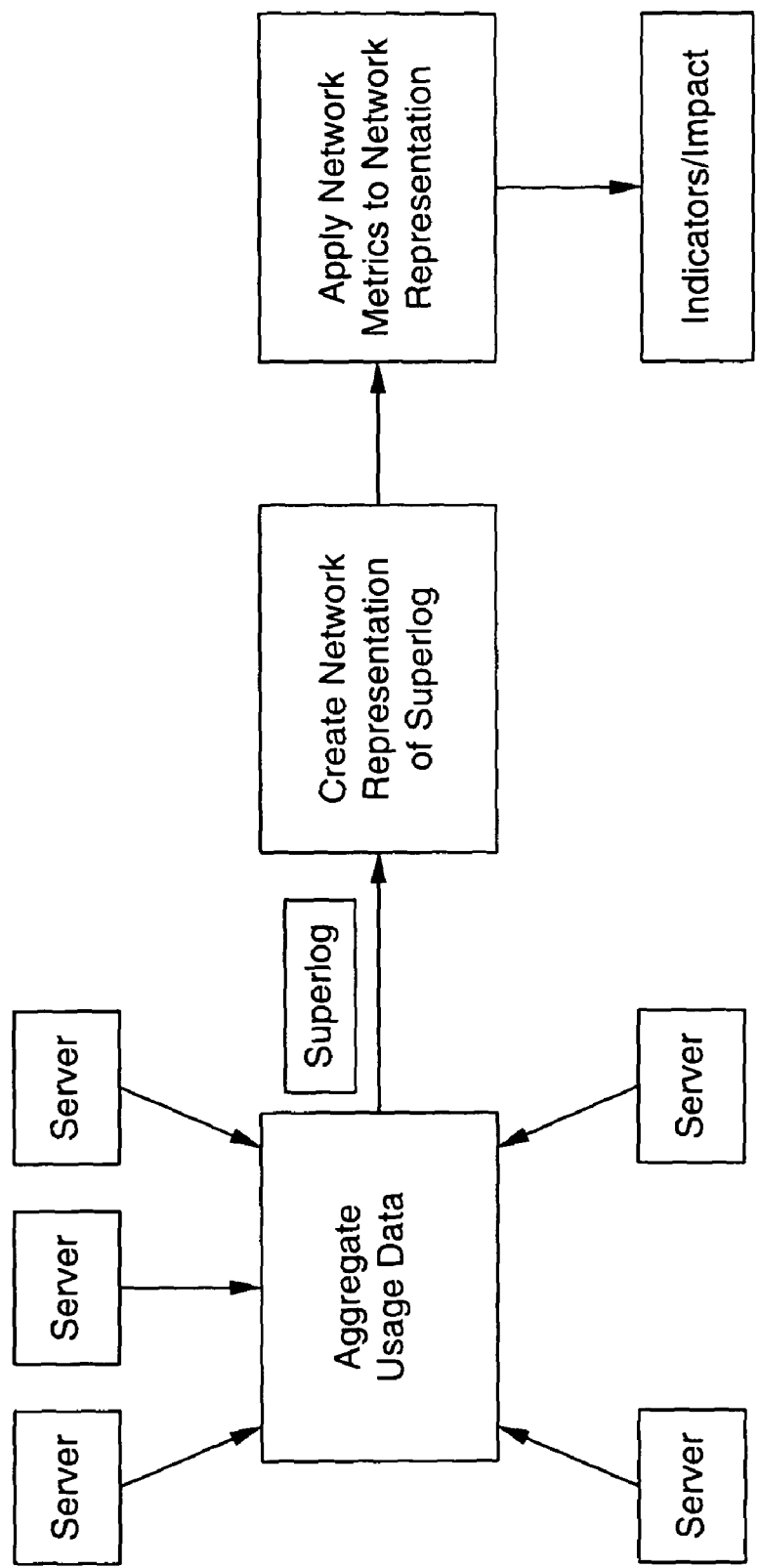
FIG. 1 is a flowchart of one embodiment of the methodology of the instant invention.

The present invention assesses the impact of scholarly works by focusing on usage data (rather than citation data), by not limiting the nature of the scholarly works for which indicators can be computed, and by taking into account structural and contextual dimensions of impact. The three processes utilized in the analysis are shown in FIG. 1 and are summarized as follows:

a. Aggregating usage information from a variety of Digital Libraries in which scholarly works to obtain a dataset—the superlog—that adequately approximates the usage of scholarly works on a global scale.

b. Deriving a graph (network) representation of the superlog. This is achieved by representing each scholarly work as a node in the graph, and by creating weighted edges between nodes (scholarly works) through the application of a methodology to derive node relationships from usage patterns. Such relationships are expressed in the graph by means of edges that connect nodes on the basis of their usage.

c. Computing network metrics based on the graph to obtain indicators of the status or impact of nodes in the graph.

The resulting data (aggregated logs), the graph expressing relationships between scholarly works, and the impact indicators are valuable for the assessment of the quality of the scholarly production of individual researchers, departments, research institutions, and countries. They are also of interest to managers of library collections, and for stoichiometric studies.

They allow society as a whole to monitor the evolving impact or status of scholarly works, which can include journal articles, journals, preprints, data sets, simulation data, images, multimedia publications, web pages, and so forth. In fact, any type of existing and future scholarly workforce which usage information is available.

1.1 Overview 1.1.1 Aggregating Usage Data

A widely-adopted protocol used for the aggregation of descriptive metadata from distributed Digital Libraries is the Open Archives Protocol for Metadata Harvesting (OAI-PMH). In projects aimed at creating recommender systems based on Digital Library usage information, the OAI-PMH was used for the transportation of usage information, captured by the Los Alamos National Laboratory (LANL) linking server, expressed in an XML format between systems at LANL and Old Dominion University (ODU). The technique developed in the LANL/ODU project strongly suggested that the OAI-PMH can be used as a protocol to aggregate usage information from a variety of Digital Libraries. Certainly, log aggregation is essential to obtaining a superlog that adequately represents usage information on a global scale.

1.1.2 Deriving a Network from Usage Data

The main principle underlying the generation of a Reader Generated Network (RGN) is a data mining technique called the Retrieval Coherence Assumption (RCA), namely, the notion that when a Digital Library user downloads a set of documents, he or she is often driven by a specific information need. From the RCA it follows that when we observe a reader sequentially downloading a set of articles, we can infer a certain probability that the downloaded articles, and thus, the journals in which they appeared, are related. Their degree of relatedness can be determined on the basis of two factors. First, the closer the documents are located within a sequence of reader downloads, the more related they are expected to be. The RCA thus applies most reliably to the shortest retrieval sequences, that is, pairs of documents downloaded one after the other. Second, the more frequently a particular pair of documents is downloaded by a group of readers, the greater the degree to which we can assume these documents to be related.

For example, when readers frequently download article A shortly after downloading article B, this may indicate A and B are related by a common user information need. Consequently, the journal in which A was published may be related to the journal in which B was published. This download sequence of two documents thus reveals implicitly whether or not the two journals in which A and B were published are related in the reader's mind. Given that we have a Digital Library log which records a large set of document downloads, we can reconstruct reader download sequences and use these to determine journal relationships. Such an approach is strongly related to item-based collaborative filtering techniques, market basket analysis, and clickstream data mining which analyze user downloads and hyperlink traversals to generate a set of document relationships.

We have applied the RCA to the construction of the RGN. An algorithm updates journal relationship weights according to the frequency with which articles within these journals have been downloaded in temporal proximity. The download patterns of individual readers each contribute small amounts to journal relationship weights, and induce only small changes in the RGN. However, consistent download patterns over a group of readers will gradually establish a set of significant journal relationship weights which reflect the degree to which articles within the two journals have been downloaded by readers within the same download sequence. Over a large population of users and items, items can be expected to be related to the degree to which they have been statistically simultaneously downloaded in the same user sessions.

Thus, using the Retrieval Coherence Assumption, a network of scholarly works can be generated from usage information in creating edges between scholarly works that have been used by the same user in the same session. The weight of the edge between two nodes represents the frequency of co-retrieval of the scholarly works represented by those two nodes.

1.1.3 Network Metrics

Social network metrics of status have been used to characterize final hyperlink structures of adaptive hypertext systems.

Social network metrics are concerned with determining who, within a network of personal relationships, can be deemed most important. This is done by examining the position of an individual in the context of his or her relationships to other individuals. Well-connected individuals, those that are "central" to overall network structure, are generally thought to be important or have high status.

Since they are based on general network features (link patterns), social network metrics can be applied to any network that represents meaningful relationships between a collection of nodes, e.g. citation networks and the web's hyperlink network. A prominent example of the latter is the Google search engine, which uses the hyperlink structure of the web hyperlink graph to determine page quality or importance.

Specifically, social network metrics of node status can be applied to networks derived from usage data of scientific works available via a Digital Library. Prototypes were implemented to use social network metrics to rank scientific works for sets of networks derived from LANL usage data, using the Coherence Retrieval Assumption. The resulting rankings deviated considerably from the ISI IF data.

The literature on social network analysis generally mentions three common metrics of status that can be defined in capturing the notion of structural impact.

a. Degree centrality of a node is defined as the sum of a node's in- and out-degree. It can thus be calculated from the sparse matrix DB table by simply counting the number of triplets which refer to a particular node. That is, counting the number of network edges starting or arriving at the node.

b. Closeness centrality of a node is defined as the average closeness between the node and all other nodes on the network. Closeness is inverted distance, so closeness can be calculated on the basis of network distance. The network distance from node a to all other nodes can be calculated by an iterative procedure that first retrieves the set of nodes that a connects to from the sparse matrix table. A network distance of 1 is recorded for these nodes. This set of nodes is then expanded by retrieving the set of nodes they connect to. A network distance of 2 is recorded for the resulting node, and so on. Eventually, all nodes that can be reached through some path starting from node a will be retrieved, and the corresponding distances noted. The average closeness is then calculated as the inverted average of these distances.

c. Betweenness centrality of a node a is defined as the number of paths connecting all nodes in the network passing through node a. The seminal Dijkstra algorithm is used in calculating these paths. Once a set of paths has been created, the frequency of the occurrence of node a can be counted. This frequency corresponds to the betweenness centrality of node a.

1.2 In Practice 1.2.1 Log Aggregation

Usage information expressed in XML is transferred between systems using the OAI-PMH and associated software tools.

1.2.2 Creation of Networks

Networks that express relationships between scholarly works as a result of applying the Retrieval Coherence Assumption have been generated based on different datasets, and using different enabling technologies. Two examples are provided below, a static network and an evolving network.

A static network was generated from usage information collected from the LANL Research Library for the period 2000-2001. Technologies used in the process of creating the graph include customized log analysis and visualization code and open-source tools. A download log was collected in plain text format and scanned for document co-retrievals by a Perl script. The script sorted the log's download records according to the IP address, time, and date of request. The IP address is used to identify individual users. A list of co-retrievals was stored in a separate text file from which a matrix representation was generated in the form of a table whose entries represented the relationship weights between pairs of journals. The matrix is then stored as a static representation of journal relationships for the period in which the log was collected.

An evolving network is being generated on an ongoing basis from usage information that is periodically collected through OAI-PMH harvesting in the LANL/ODU project. First, the harvested usage information is stored in database tables according to the individual events that the usage information contains, e.g., triplets of anonymized user information, document identification, and time of access by the user to the document. Second, these tables are reorganized to yield a set of accesses sorted by user identification, access time, and document identification. Third, a program scans the reorganized tables and applies the Retrieval Coherence Assumption by detecting co-retrieval events. These are defined as successive accesses within a predetermined time period. If a user has accessed two items in a time frame smaller than the predetermined time period, the items are considered to have been co-retrieved. Fourth, a separate table of co-retrieval frequencies is created for all pairs of items whose co-retrieval frequency exceeds zero. This table is as a sparse matrix representation of the graph which is taken to describe item relationships.

1.2.3 Computation of Impact Factors

Once a network has been generated, a set of impact indicators (social network metrics of status) can be calculated from its structure.

Figure 2:
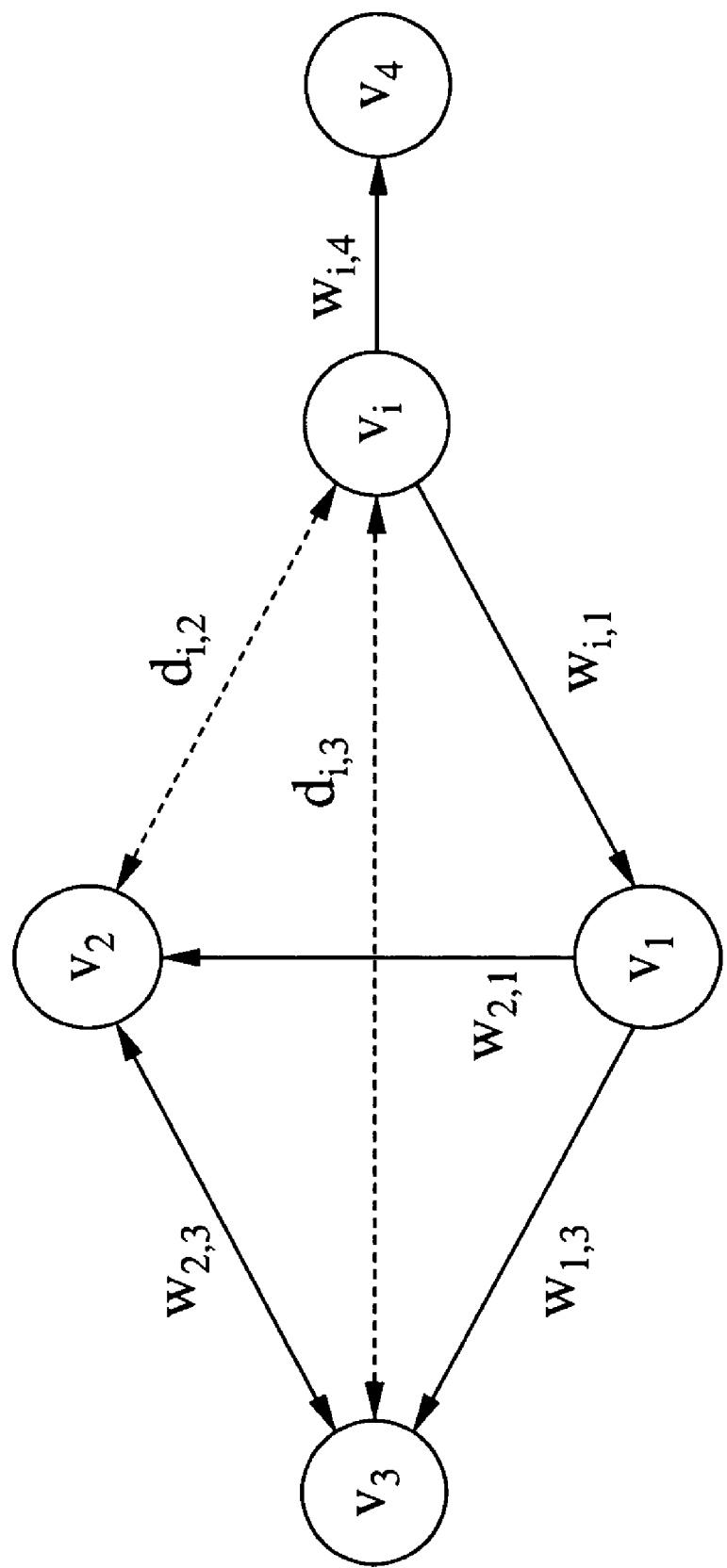
FIG. 2 is an exemplary diagram of a social network.

FIG. 2 shows an example of a directed weighted graph, which may represent a journal citation network, in which the degree, closeness and betweenness centrality of node $v_i$ can be determined. The mentioned centrality metrics are defined such that they accommodate for the presence of weighted, directional citation links. In this case degree centrality is defined as the sum of weights of links pointing to and from any node $v_i$, or:

$$c_d(v_i) = \frac{\sum_j w_{i,j} + \sum_j w_{j,i}}{\sum_{i,j} w_{j,i}}$$

The degree centrality of node $v_i$ in the journal network in FIG. 2 is $c_d(v_i) = w_{i,1} + w_{i,4}$.

Closeness centrality is generally defined as the average weight of the shortest path distance between node $v_1$ and any other node in the network. Since this case concerns weighted journal relationships and the weights represent how an author or reader may link one journal to another (flow), we define the shortest path weight between nodes $v_1$ and $v_j$, labeled $w_s(v_i, v_j)$ as the product of its constituent link weights, and the distance between any two nodes consequently as the inverse of their shortest path weight. In FIG. 2, for example, the distance between node $v_i$ and $v_2$, $$d(v_i, v_2) = \frac{1}{w_{i,1} \times w_{1,2}}$$

We then define:

$$c_c(v_i) = \frac{\sum_j d(v_i, v_j)}{N}$$

where N represents the number of shortest-path connections that exist between any pair of nodes $v_i$ and $v_j$.

As such, the closeness centrality of node $v_i$ in the journal network in FIG. 2 is expressed as:

$$c_c(v_i) = \frac{w_{i,1} + d_{i,2} + d_{i,3} + w_{i,4}}{N}$$

Betweenness centrality is generally defined as the number of shortest paths that pass through a node $v_i$. Using the above defined shortest path weight, however, we define $v_i$'s betweenness centrality $c_b(v_i)$ as the sum of the weights of the shortest paths that pass through $v_i$:

$$c_b(v_i) = \sum_j w_s(v_i, v_j)$$

In FIG. 2, the betweenness centrality of node $v_i$ would be zero, because it is not on the shortest path connecting any other pair of nodes. All three centrality metrics represent different aspects of status. Degree centrality, which focuses on the total number of relationships to other nodes can be viewed as an expanded version of the ISI IF, i.e. in addition to a node's (in this case, a journal's) in-degree (back-link frequency), it also takes into account its out-degree. Closeness centrality expands this concept further by not only taking into account the number of immediate neighbors of a node (in- and out-degree), but its network proximity to all other nodes. Betweenness centrality examines how well a node connects pairs of other nodes. A node may have few neighbors and therefore a low degree centrality. However, it may function as a vital bridge through which the paths connecting large groups of nodes pass. In this latter case, its betweenness centrality will reflect this fact.

In the degree, closeness, and betweenness centrality metrics we see a gradual expansion of the notion underlying the ISI IF, namely that the status, or rather impact, of a journal can be determined from the number and patterns of its relationships to other journals. Starting from the ISI IF and ending with the betweenness centrality, we see a gradually increasing focus on network context and structure, away from frequentist metrics.

The use of structural metrics, such as those described above, reveal more subtle aspects of impact, including, but not limited to:

a. transferred status: direct or indirect association with high impact actors b. implicit status: not being frequently endorsed in a direct manner, but nevertheless indirectly connected to many other actors through paths longer than one or two links c. gateway status: low frequency of direct endorsement, but having a vital position on the paths that connect many pairs of actors.

2. Architecture

This section outlines a technical, standards-based architecture for recording, representing, sharing, and mining usage information of scholarly information services. OpenURL-compliant linking servers play an important role in the proposed solution, as they naturally aggregate the navigations of a specific user community across the distributed information services that are available to them. As will be discussed in detail in the remainder of this section, the following four phases can be distinguished in the proposed log harvesting architecture:

1. Intra-Institutional Aggregation of Usage Data

Usage events generated by users of a specific institution as they navigate their distributed scholarly information environment are recorded by the institutional linking server.

2. Exposure of Institutional Usage Data

The institutional usage data recorded by the linking server is exposed through an OAI-PMH-compliant log repository in which each event is represented as XML ContextObjects.

3. Inter-Institutional Aggregation of Usage Data

OAI-PMH harvesters collect the usage data from a variety of OAI-PMH-compliant institutional log repositories.

4. Service Provision

Value-added services are implemented based on the aggregated usage data collection.

2.1 Intra-Institutional Aggregation of Usage Data

Starting around 2001, scholarly information services have in great numbers begun to support the concept of context-sensitive services by implementing the OpenURL 0.1 specification, while academic and research libraries have increasingly installed the linking servers that are required to provide localized services to their user base.

Figure 3:
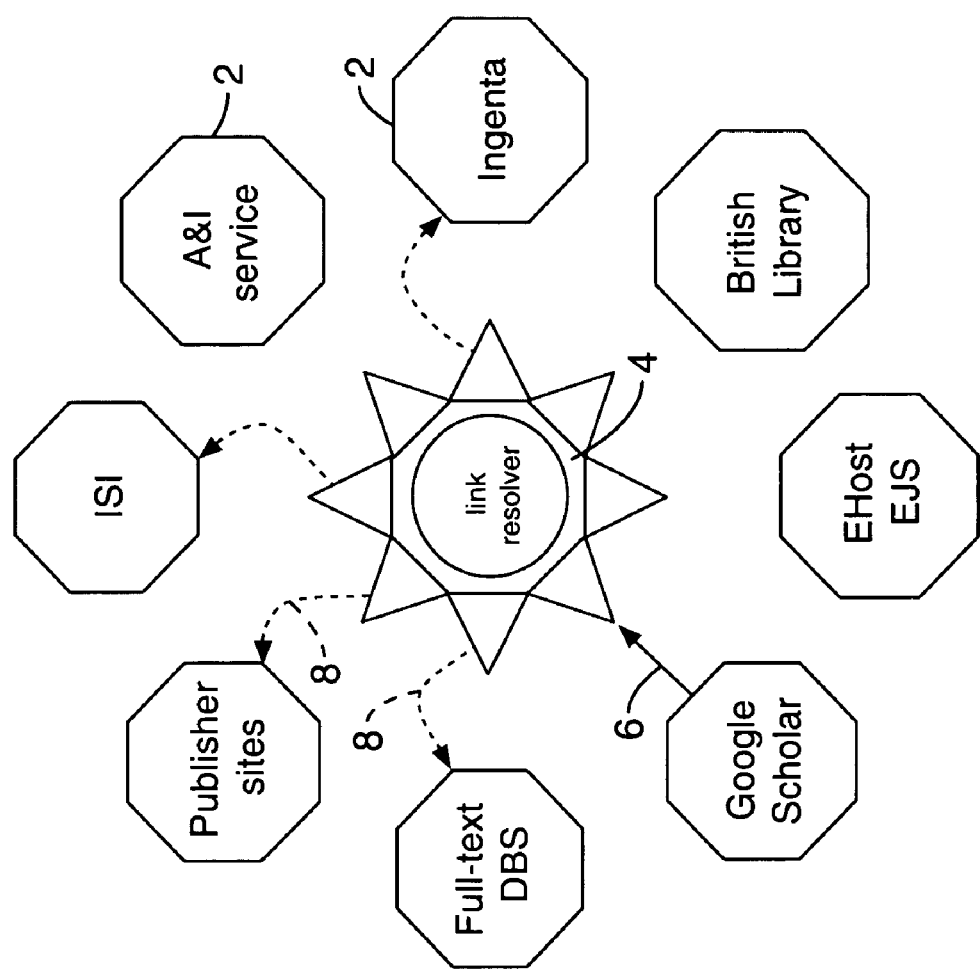
FIG. 3 is a exemplary diagram of the information environment of a user community.

FIG. 3 shows the information environment of a particular user community as it could exist for an academic institution. It shows the many distributed scholarly information services 2 that are accessible to that user community, and it shows an institutional linking server 4 as a central hub in this information environment. In the context-sensitive service environment enabled by OpenURL and linking servers, an information service 2, such as Google Scholar, inserts an OpenURL 6 for every reference to a scholarly work that it presents to a user, for example, as a search result. This OpenURL 6 is an HTTP GET request carrying metadata that are essential to identify the referenced work. It points to the linking server 4 of the users' institution which contains a rule engine powered by a knowledge database that is typically maintained by the user's institutional library. Given an incoming OpenURL request 6, and through consultation of its localized rules and knowledge database, the linking server 4 returns a list of services 8 pertaining to the referenced work to the user. Those services 8 typically point into other information services available in the users' distributed information environment, such as Ingenta, ISI, publishers sites, and Full-text DBS.

The central position held by a linking server 4 in the distributed scholarly information environment of a specific user community makes it particularly appealing as the source of usage information. Indeed, a linking server 4 logs the OpenURL requests 6 of all users of the community originating from many of the available distributed information sources 2. As such it de-facto aggregates usage information at the level of the community, and internally represents the usage information in a normalized manner.

A particular and unique advantage of linking servers usage data is the ability to track sequences of requests across a variety of information services. Indeed, in FIG. 3, the linking server 4 is aware of the fact that the user was navigating Google Scholar, and requested services from the linking server pertaining to a referenced work. The linking server 4 also knows which of those services 8 was chosen by the user. And, if that chosen service led into another OpenURL-compliant information service, e.g, Ingenta in FIG. 3, and if the user again requested services from the linking server 4 pertaining to a work referenced there, the linking server 4 would again be aware. Such a sequence of requests can be recorded by the linking server 4 and hence exploited by click-stream based methods of log analysis to reveal temporal trends in user behavior and recommending items which are often accessed in a particular sequence. Such temporal patterns would be very difficult, if not impossible, to reconstruct from the aggregation of the logs obtained from each of the individual information services in the users' environment.

2.2 The OpenURL ContextObject for the Interoperable Representation of Usage Data Each brand of available OpenURL-compliant linking server probably stores its usage information in a proprietary manner. However, when the goal is to share usage information across a federation of heterogeneous linking servers, support for a common representation format becomes important.

Figure 4:
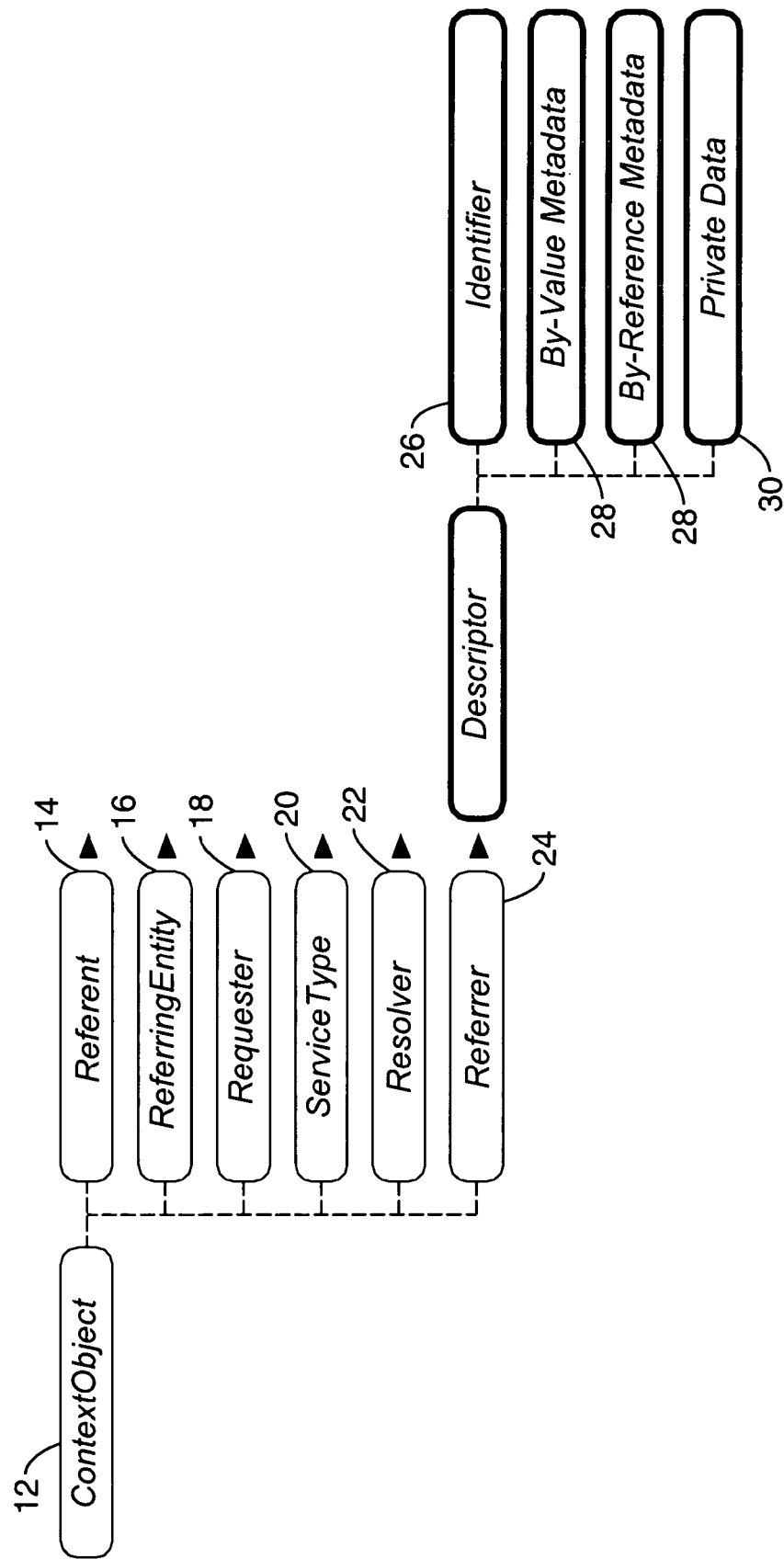
FIG. 4 shows the structure of the OpenURL ContextObject.
Figure 5:
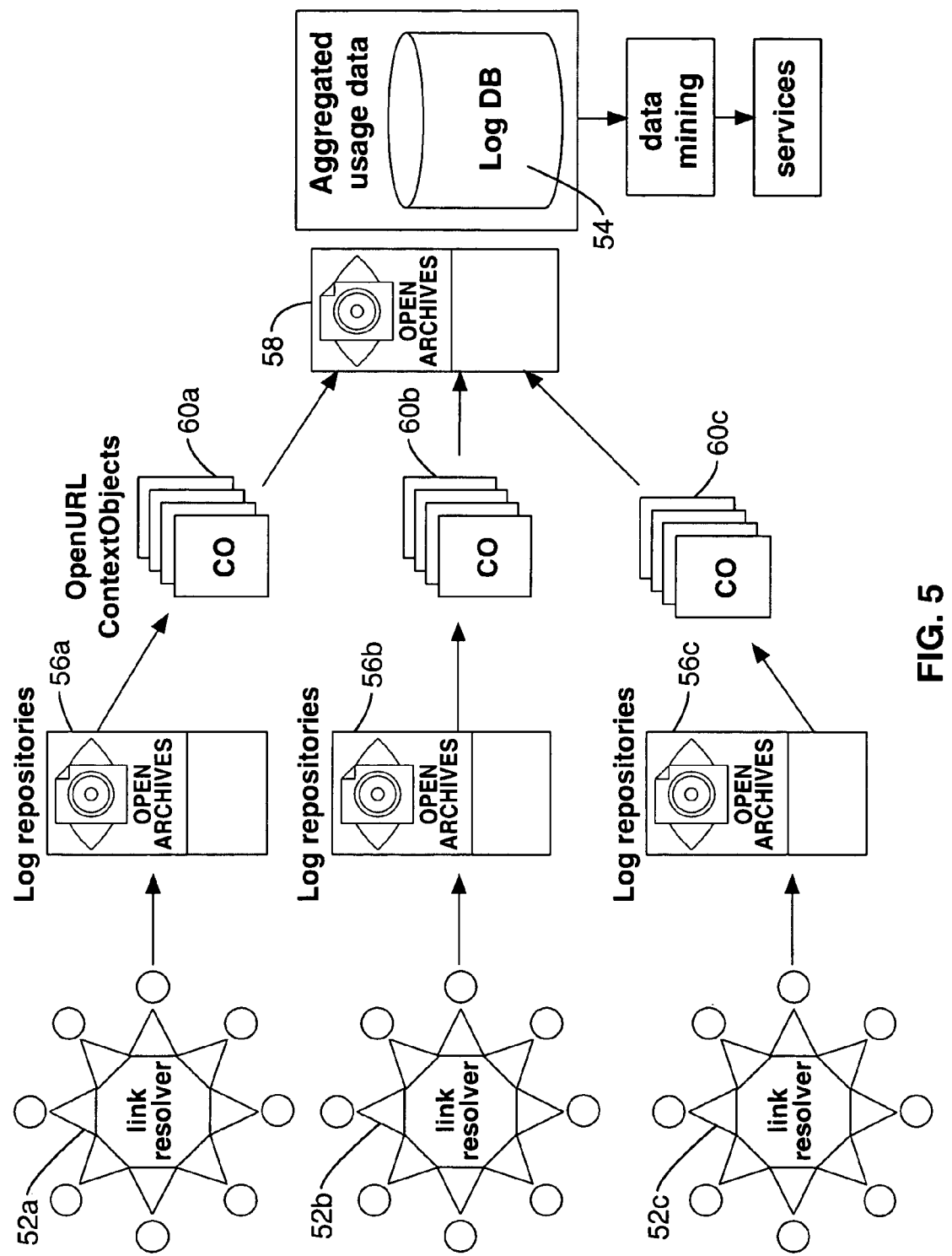
FIG. 5 shows the relationship of the linking servers to the data harvester in an embodiment of the instant invention.

The NISO/ANSI Z39.88-2004 Standard "The OpenURL Framework for Context-Sensitive Services" is a powerful generalization of the context-sensitive service concepts that were at the basis of the definition of OpenURL 0.1. At the core of the standard is the notion of the ContextObject 12. The ContextObject 12 is an abstract data structure that encapsulates six entities that are involved in the fulfillment of a context-sensitive service request. The structure of the OpenURL ContextObject is shown in FIG. 4. At the core of the ContextObject 12 is the Referent 14; it is the actual subject of the service request that the ContextObject 12 encodes, that is, the service request pertains to the Referent 14. The ContextObject, furthermore, contains the ReferringEntity 16 (the entity that references the Referent 14), the Requester 18 (the agent that requests the service pertaining to the Referent 14), the ServiceType 20 (specifies the type of service that is requested), the Resolver 22 (the target of a service request), and the Referrer 24 (the system that generated the ContextObject 12).

Each entity of the ContextObject 12 can be described by means of a combination of identifiers 26, metadata 28 and private data 30. To allow for a controlled deployment of applications based on the OpenURL Standard, the OpenURL Registry provides the capability to register identifier namespaces and Metadata Formats that are used in OpenURL Applications. The abstract ContextObject data structure can be instantiated using different serializations, and both a Key/EncodedValue pair serialization and an XML serialization have been defined as part of the NISO standardization effort. A service request pertaining to a Referent is achieved by transporting a serialized ContextObject with the Referent at its core towards a Resolver.

In the perspective of the NISO/ANSI Z39.88-2004 Standard, linking servers as described above have become a special type of Resolver, namely Resolver that supports a specific OpenURL Application known as the San Antonio Profile. Also, according to the new standard, a service request targeted at a linking server is the transportation of a ContextObject with a description of the referenced work at its core (the Referent) towards the linking server (the Resolver). Hence, since a ContextObject is the embodiment of a service request aimed at linking servers, the ContextObject also provides an appropriate data structure for the representation and sharing of usage information recorded by linking servers.

In order to illustrate the mapping between a service request issued to a linking server and the ContextObject data structure, it is worthwhile pointing out that each individual usage event can, in essence, be described by a triplet consisting of:

What: The item for which the usage was recorded (a journal article).

Who: The originator of the event (the user).

When: The time at which the event occurred (the event's timestamp).

In the proposed usage log representation technique, a usage event is defined as an individual OpenURL-compliant service request targeted at a linking server. Such a usage event is represented as an individual ContextObject according to the mapping described in the remainder of this paragraph. The what and who components of the triplet can readily be mapped to the Referent and Requester entities of the ContextObject, respectively. Moreover, as can be seen in Table 1, the ContextObject allows for the inclusion of descriptions of other entities that are relevant to a service request and hence to the downstream exploitation of the represented usage data: the Resolver, the ServiceType, the Referrer, and the ReferringEntity. These mappings are independent of the serialization format of the ContextObject. In order to include the when component of the triplet, a choice for the XML serialization of the ContextObject must be made as that provides an administrative information element, namely the timestamp attribute, which indicates when the ContextObject was generated, which in the context of this application is the moment at which the service request was issued (see Table 2). Moreover, when aiming at the global sharing of usage information it is important to be able to unambiguously identify each event recorded by a linking server. To that end, each event represented by a ContextObject is accorded a globally unique UUID by the linking server, which can be conveyed using another administrative element of the XML ContextObject, namely, the identifier (see Table 2).

The ability to express all the entities that pertain to a service request in a standard-based, self-contained data structure is quite appealing in light of the need to share usage data across the boundaries of information services and communities. Because the proposed mappings are done with the aim of sharing usage information across a federation of linking servers, the choice for the XML ContextObject format seems logical instead of restrictive. Moreover, the XML ContextObject format allows entities of the ContextObject to be described using more than one Metadata Format, as such allowing for very expressive descriptions whenever possible or appropriate.

Table 2 shows an example of linking server usage data encoded according the described mapping; for brevity XML Namespace declarations have been omitted:

The root context-object element has two attributes, the timestamp and the identifier, with semantics as described above.

The Referent is a journal article that is being described by both an identifier and by metadata. The identifier is a DOI identifier expressed as a URI following the "info" URI scheme, while the metadata is compliant with the XML Metadata Format to describe journal articles. This Metadata Format is registered in the OpenURL Registry along with its XML Schema definition.

The OpenURL Registry contains XML Metadata Format definitions for other types of scholarly works including dissertations, books, and patents. Metadata Format definitions for other types of works, for example datasets, can be registered, and, for flexibility, the OpenURL Standard allows for the use of unregistered Metadata Formats.

The Requester is described by means of an identifier which in this example consists of the IP address of the user's computer represented using an ad-hoc URN scheme. Typically, the IP address is the only information that is available for a Requester. However, if more information, such as an EduPerson user record, would be available, it could be expressed using XML and hence could be included as a metadata description of the Requester. Similarly, the inclusion of session information as a more expressive proxy to the Requester than the IP address is possible through the definition of a Metadata Format or identifier scheme. However, due to privacy concerns it is likely that less rather than more Requester information would be made available when sharing usage data beyond the boundaries of an institution, or that such information would become encrypted or anonymized.

The ServiceType is described by means of a Metadata Format registered in the OpenURL Registry. This Metadata Format allows for the expression of one or more services that were actually requested by the user from the linking server about the scholarly item that is the Referent. The example indicates that the user requested the full-text of the article; other services that are expressible using this Metadata Format include "abstract", "citation" and "holding".

The Resolver is described by means of an identifier, which is the HTTP address of the linking server at which the service request was targeted. Again, it can easily be imagined that this information would be encrypted or anonymized if usage information is shared beyond an institution.

The Referrer is described by means of an identifier using the registered "sid" namespace of the info URI scheme. The identifier indicates that the user was navigating the Scopus service of Elsevier Science when requesting services from the linking server.

2.3 Inter-Institutional Aggregation of Usage Data

Usage data pertaining to the scholarly information collection of a specific institution is a valuable asset for those institutions that choose to record and exploit it. For example, it allows management to track usage as it occurs and to make accurate and community-driven collection development decisions. It can also be used in recommender services to enhance the discovery capabilities of users.

However, increased value of usage data can be realized when it is aggregated over a large number of information sources and communities such that a representative sample of the activities of the scholarly community (or a well-defined subset thereof) is obtained. If such aggregation can be achieved, applications can be imagined that discover, analyze and predict trends in the scholarly endeavor; recommender systems can be built that are based on the activities of a global scholarly user base; and a new generation of usage-based impact and quality metrics can be defined, deployed and used to balance the monopoly of the citation-based ISI Impact Factor.

To allow for the emergence of large-scale collections of usage data, mechanisms for exchange and aggregation need to be devised. In the proposed approach, linking servers are used as intra-institutional aggregators of usage information. In order to allow for the inter-institutional aggregation of usage information, an OAI-PMH based technique is proposed in which an OAI-PMH repository with the following core properties exposes the usage logs of an institutional linking server:

Contained records are XML ContextObjects only. Each ContextObject represents an event recorded by the linking server as explained above.

The identifier used by the OAI-PMH is the globally unique UUID that unambiguously identifies a linking server event; it is the same as the value of the identifier attribute to the root element of the XML ContextObject.

The datestamp used by the OAI-PMH is the datetime the event was uploaded to the log repository. Because it is expected that the log repository will be a derivative of the logs as stored by the linking server, the OAI-PMH datestamp does not coincide with the datetime of the event as provided in the timestamp attribute to the root element of the XML ContextObject. It should be noted that the datestamp of a record never changes, as an event will never be updated once it has been recorded and uploaded to the log repository. As a result, once harvested by a usage data aggregator, a record will not have to be re-harvested.

The only supported metadata format is the XML ContextObject Format (with metadataPrefix resolver_logs), registered in the OpenURL Registry along with an XML Schema definition.

The harvesting granularity can be either at the day-level or the seconds-level.

No set structure is provided.

Table 3 shows an example of an OAI-PMH record that contains the ContextObject of Table 2. This OAI-PMH-based approach allows harvesters to recurrently collect usage data as recorded by institutional linking severs, and to compile a usage data collection with a global or regional reach. The creation of aggregated collections with a different focus, such as a discipline-specific aggregation, would either require post-processing of harvested logs, or the introduction of conventions regarding discipline-oriented set structures at the level of the log repositories. The latter has proven to be problematic for OAI-PMH repositories that expose Dublin Core metadata, and, given their noisy nature, may turn out to be unrealistic to achieve for usage data.

2.4 Service Provision

Once usage data is aggregated across the boundaries of a single information service and a single institution, as facilitated by the aforementioned approach, services can be created on the basis of the aggregated usage data collection. A major attraction of the proposed approach is that many aggregators can emerge, each of which could experiment with the creation of yet unknown services by mining the usage data collection in a variety of ways. As described in the following Section, our experiments have so far mainly focused on the creation of a recommender system and on the extraction of metrics that may eventually be attractive for the assessment of the quality and impact of scholarly works.

3. Results

As a proof of concept, the described architecture was implemented in conjunction with the most widely deployed commercial linking server, the SFX server from Ex Libris. To that end, an autonomous usage data add-on to the SFX linking server software with the following capabilities was implemented (see FIG. 5):

1. The add-on can ingest the usage data from the link resolver 52*a-c* into a special purpose log database 54.

2. The log database of each linking server 52*a-c* is exposed as an OAI-PMH-compliant log repository 56*a-c* with characteristics as described in the above.

3. The add-on contains an OAI-PMH usage data harvester 58 which has the ability to collect usage data 60*a-c* from remote OAI-PMH-compliant log repositories, and to merge the harvested usage data with the linking server's own usage data. Care is taken not to re-expose usage data that was obtained through harvesting from remote linking servers.

To gain experience with building services on the basis of a large log collection, usage data was aggregated across the California State University (CalState) campuses. The CalState system is one of the largest systems of public universities in the US. It comprises 23 campuses and seven off-campus centers which combined have a population of 409,000 students and 44,000 faculty and staff. The CalState system has deployed SFX live since Fall 2002 and uses an SFX consortium model consisting of 23 SFX linking servers (one per campus) and one for shared resources (operated by the Chancellor's Office). For reasons of scale and its long-standing use of linking servers the CalState data offered a unique testing opportunity. Our initial experiences with building services on the basis of a large usage data collection are discussed in the remainder of this section.

3.1 Aggregated Usage Data Collection

Usage data from nine CalState linking servers were included for an initial analysis. These 9 linking servers were selected because their IP-address distributions suffered the least from IP-address distortions caused mainly by the reliance on proxy servers when requesting services from a linking server. When accessing a linking server through a proxy, the real IP-addresses of the Requester are obscured. Later modifications were made to replace the IP address with an anonymous session ID to avoid this issue.

The nine selected instances were Chancellor, CPSLO, Los Angeles, Northridge, Sacramento, San Jose, San Marcos, SDSU, and SFSU. They represented the majority of linking server usage data in the CalState system. Usage data had been recorded at these institutions in the period Nov. 11, 2004 (10:44 AM) to Aug. 8, 2005 (11:43 PM).

This data set was aggregated and loaded into the aforementioned add-on's special purpose log databases. The resulting collection consisted of 3,507,484 unique usage events. A de-duplication process run on the basis of the identifiers and the metadata describing the Referents (documents) involved in the events, resulted in a total of 2,133,556 unique Referents in the data set; the set contained 167,204 unique Requesters when using the user agent's IP-address as the Requester's identifier. A majority, i.e. 67%, of the Referents were journal articles.

3.2 Mining Item Relationships from CalState Usage Data

Usage data naturally consists of a temporally ordered but otherwise unconnected sequence of usage events. In order to perform more sophisticated, network-based methods of Referent ranking and to create recommender services able to link one Referent to the other, a network of item relationships needed to be extracted from the CalState usage data. It was therefore subjected to a technique similar to that employed by amazon.com which relates products if they have been purchased by the same users. As a corollary we related pairs of Referents in the CalState usage data according to the degree to which they were consistently accessed by the same users. This technique is highly related to collaborative filtering and association rule learning.

This procedure resulted in a network of Referent relationships represented by a Referent relationship matrix. Since usage is not bound by Referent type (journals, articles, etc), Referents were not differentiated in the network and therefore journals could e.g. be related to articles and vice versa. As a starting point for our preliminary data analysis we needed a more focused network. Therefore, a network of relationships between journals was generated by aggregating all journal article relationships between articles published in the same journal. The resulting journal relationship network pertained to a set of 45,554 journals for which 1,927,506 journal relationships were derived. Table 4 shows a sample of the matrix representing this journal level network; each entry in the matrix reflects the strength of the relationship as inferred from the usage data collection.

3.3 Usage Impact Ranking

The Google search engine uses the PageRank algorithm to determine the impact of web pages on the basis of how often they are linked to by high impact web pages. A page receiving many in-links from high-impact pages is assumed to be of high impact itself. Since a network of journal relationships has been established from the mentioned CalState usage data, its journals can now be ranked according to the same algorithm which has proven effective in web searches. The PageRank values calculated on the basis of usage-defined journal networks is referred to as Usage PageRank.

Table 5 lists the 10 highest scoring journals according to their Usage PageRank and their corresponding 2003 citation Impact Factors. The latter reflects the impact of a journal according to the frequency by which its articles are cited over a 2-year period, i.e. 2001 and 2002. Juxtaposition between the Usage PageRank and citation Impact Factors can therefore reveal how the impact of a journal in the CalState system deviates from the general scholarly community. Journals whose usage PageRank deviates strongly from the citation impact factor are therefore marked with a "*".

These results indicate that usage and citation indicators of journal impact agree only for a number of top journals such as Nature and Science.

However, for a large group of journals there exist significant deviations which correspond to what one could assume is the institutional research focus in the CalState system. In other words, the journals "Nature" and "Science" are equally important in the CalState community as they are in the general scholarly community, but the Journal of Advances in Nursing (J ADV NURS) is much more important in the CalState community than its general citation rates indicate.

The rankings on the basis of Usage PageRank offer the enticing possibility of more accurately pinpointing the dynamic preferences and interests of a particular user community, in this case CalState. In addition, they confirm earlier results obtained for the Los Alamos National Laboratory user community. One could speculate that with increasing sample sizes these rankings could provide a global indication of the status of scholarly communication items for the entire scholarly community thereby augmenting or even replacing existing citation-based methods.

3.4 Journal Level Interest Mapping

Figure 6:
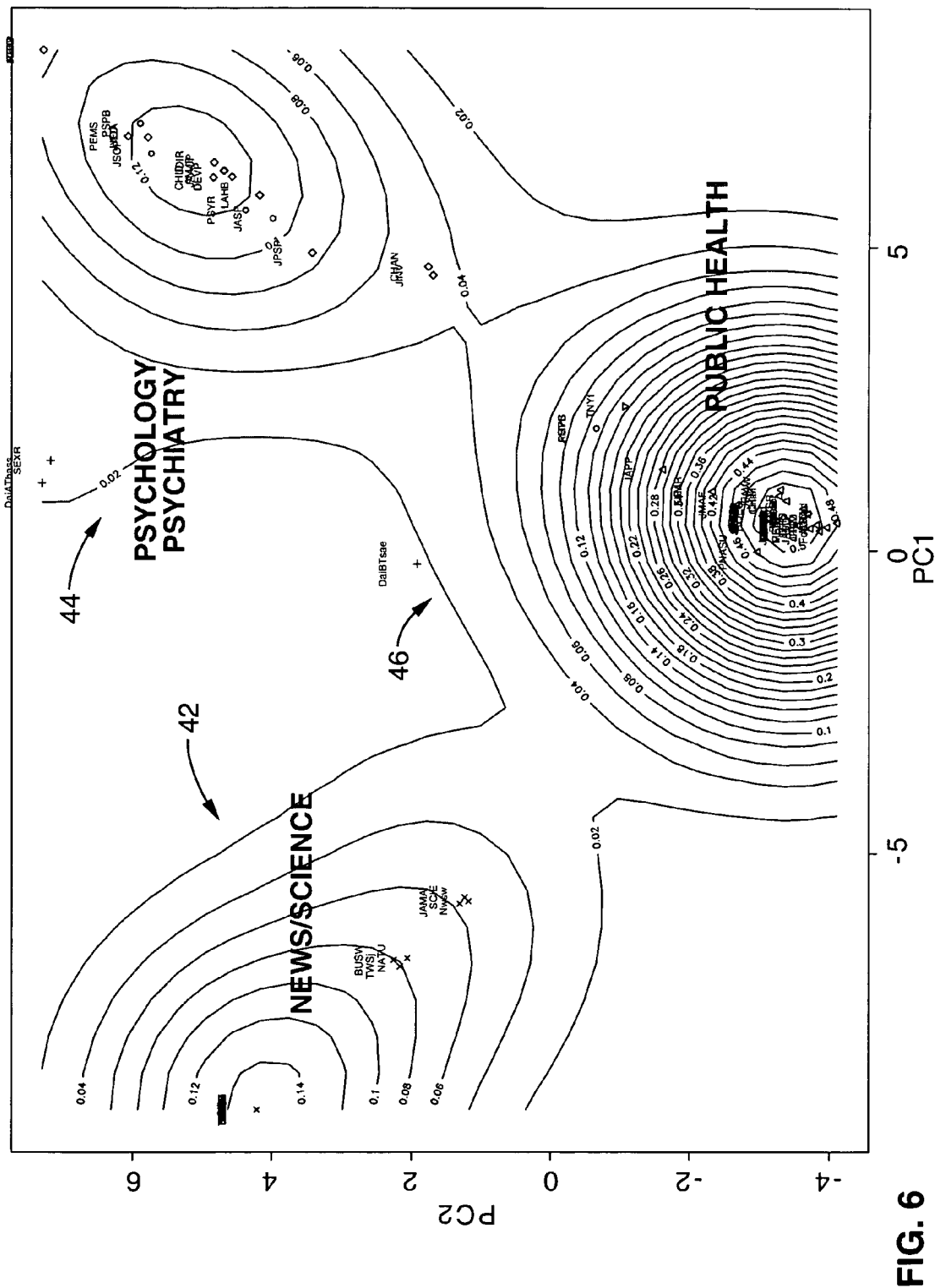
FIG. 6 is a mapping of journals accessed in the CalState system on the basis of usage according to an embodiment of the instant invention.

The ranking of journals according to Usage PageRank offers an informative view of the CalState community's characteristics. A comparison with the 2003 citation Impact Factors highlights journals of particular interest. To describe the properties of this community in finer detail, a geographical mapping of journal usage relationships can be generated by a Principal Component Analysis. Such a mapping places journals in a 2-dimensional location according to how similar or dissimilar their usage is. FIG. 6 shows the resulting mapping of journal similarities derived from the CalState usage data. The graph reveals three main clusters of interests, namely, a "news" cluster 42 (top left), a "psychology" cluster 44 (top right) and a "public health and policy" cluster 46 (mid bottom). This mapping forms a model of how CalState users interact with their information services and can thus serve as the basis for an analysis of user habits and interests. The fact that a meaningful structure emerges in this mapping indicates the validity and quality of the aggregated linking server usage data.

3.5 Recommender Services

The generated relationship networks encode which journals (or any type of Referents) are related in their usage to which others. They can therefore be used to recommend documents whenever a user expresses interest in a specific document (or set thereof). On the basis of the general Referent relationship matrices, a prototype recommender service was constructed which accepts a description of a journal or article (identifier and/or metadata) as input and then scans the relationship matrices for viable suggestions.

Figure 7:
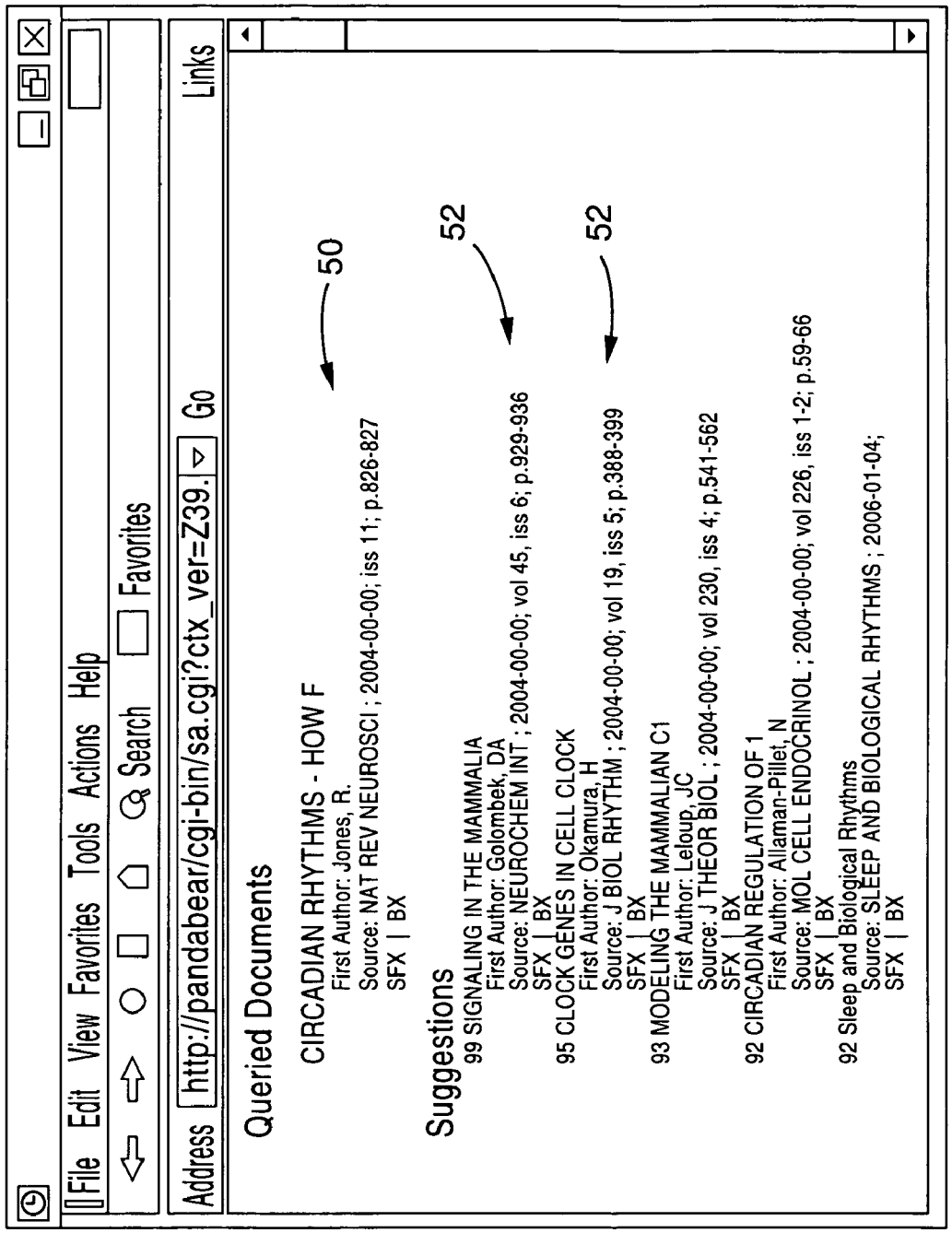
FIG. 7 is a screenshot of a prototype system that generates usage-based recommendations.

FIG. 7 shows a screenshot of the implemented prototype. Table 6 and 7 show the results obtained for two recommendation requests. In the case of Table 6, recommendations were requested for an article on the subject of "Circadian rhythms" 50. Among the top ten results 52, we indeed find mostly articles strongly related to varying aspects of circadian rhythms and the physiological aspects of biological clocks. Table 7 lists the results generated for a query relating to the issue of learning reading skills at an early age. Indeed, all top 10 ranked recommendations relate to education and schooling issues. Note that results were obtained on the basis of usage data, not on the basis of term extraction. For example, in Table 6, an article entitled "You talking to me?" is issued as a valid recommendation, even though none of its metadata items matches those of the query document.

Although these results do not represent a valid, quantitative analysis of the effectiveness of usage-based recommendations, they do serve as a promising pointer to the potential value of scholarly usage data for advanced end-user services. In fact, the principle of deriving recommender systems from usage data has already been widely validated in the literature and we expect scholarly usage data to be no exception.

4. Other Issues

A number of noteworthy issues related to the large-scale aggregation and exploitation of usage data were encountered in the course of the reported work. They are described in the remainder of this section.

4.1 Linking Server: Representativeness

There are drawbacks associated with the use of linking servers in a usage log aggregation framework relating to scope, scale and representativeness. Indeed, although OpenURL is widely supported by scholarly information services, support is not universal, and especially new types of nodes in the scholarly communication environment such as Institutional Repositories and Dataset Repositories lag behind. Also, information services present value-added services to users, the use of which is only recorded at the level of the information service itself, not at the level of the linking server. As a result, the linking server logs do not capture all events related to documents referenced in information services. Indeed, linking server logs may validly represent the actions of its user base, but they will inevitably miss certain aspects of usage. Future investigations need to focus on the definition of sampling statistics to determine the representativeness of linking server logs.

4.2 Referent De-Duplication

When linking server logs are recorded and aggregated, it is of vital importance that usage events pertaining to the same or a different Referent are recognized as such, i.e. the aggregated usage data must be de-duplicated at the level of the Referents to avoid over- and undercounting which occurs when two Referents are falsely confounded or distinguished respectively.

The issue of Referent de-duplication was approached by the introduction of a metadata-based de-duplication key that met the following criteria:

1. The metadata components used in the construction of the de-duplication key must be available for a large majority of the processed Referents. If not, many events would end up with empty fields in their keys and hence would lead to problematic de-duplication results.

2. A maximum number of identical Referents and a minimum number of dissimilar Referent should be joined.

To identify de-duplication key candidates, we adopted an iterative procedure which selected those n-tuplets of metadata items which occurred in the highest number of Referents. From these candidates a final key was selected which offered the best pragmatic compromise of the availability of metadata components and de-duplication results. The key consisted of:

{issn, start page, publication year, M (article_title,25)} where M (article_title,25) represents a fuzzy match (Levenshtein distance) on the first 25 characters of the article title.

It should be noted that the proposed architecture does not depend on the simple de-duplication approach described here, and that alternative, and superior, schemes for the de-duplication of Referents can easily be integrated.

4.3 Agent De-Duplication

Figure 8:
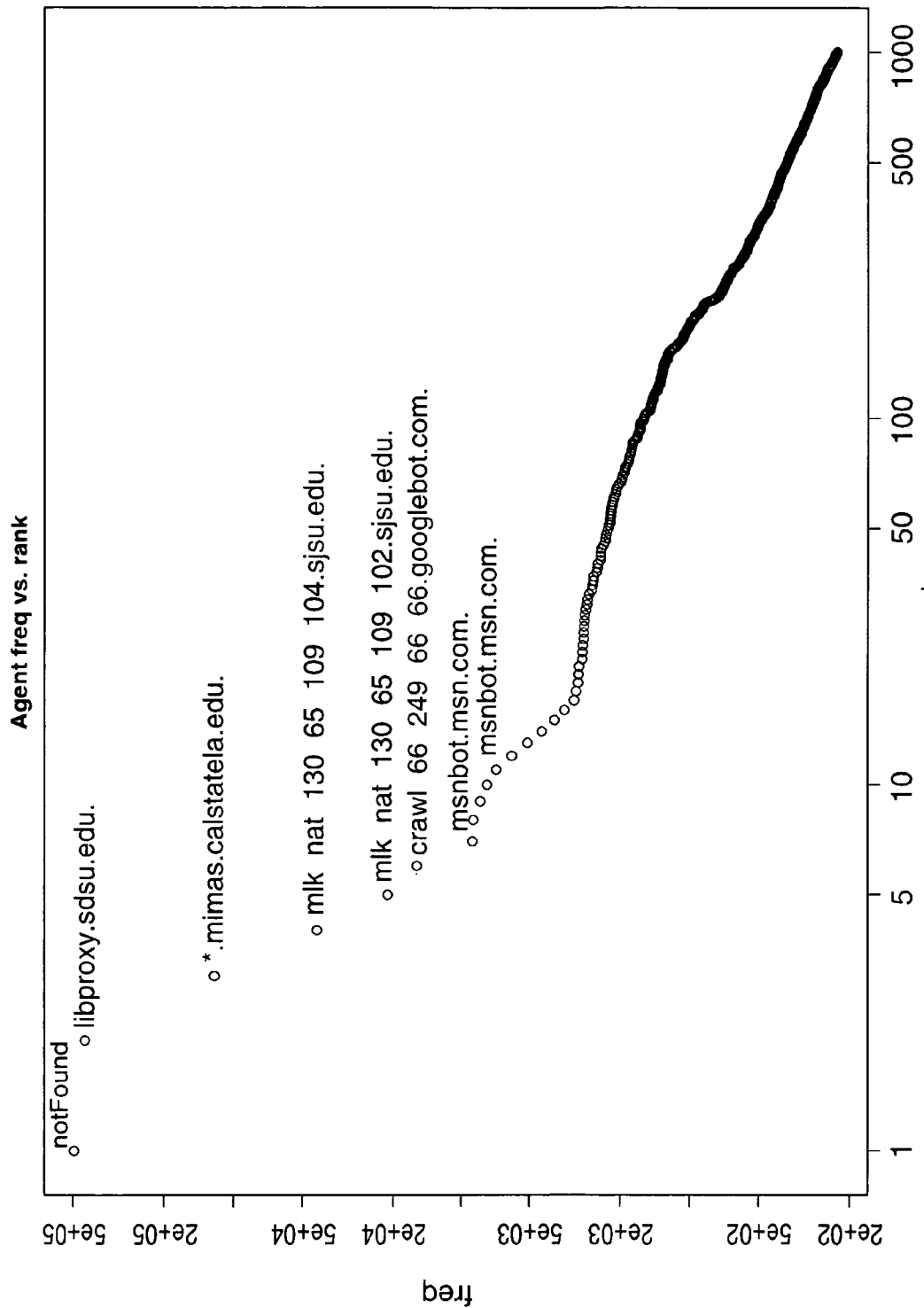
FIG. 8 shows how the distribution of the frequency of the request issued by particular IP addresses is distorted by the use of proxies and web robots and crawlers.

The use of IP addresses to identify Requesters is prevalent, but leads to noisy usage data due to the use of proxies, localhost request, and robots/crawlers. FIG. 8 shows how the distribution of the frequency of the request issued by particular IP addresses is distorted by the use of proxies and web robots and crawlers. The distribution follows the expected power-law only when the first 25 IP addresses are discarded. These IP addresses were indeed shown to correspond to localhost requests, proxies and robots/crawlers.

Three options were identified to mitigate this problem. First, the contributions of usage events originating from particular Requesters could be weighted inversely by their frequency of occurrence, i.e. the more frequent an IP address in the usage data, the lesser its contributions to the final usage statistics. This solution has the advantage that no predefined, manual filtering of usage data is required. Second, a manual filtering based on knowledge of the local linking server setup could be conducted. This is a highly effective approach but cumbersome, and not scalable because of the manual intervention. Third, a retooling of the linking server to use random, unique and anonymous session ID cookies rather than IP addresses could be adopted. Although this solution is prevalent in the Web-based retail environment, it still raises some controversy in the realm of scholarly information services because it relies on the use of client-side information which raises privacy concerns.

4.4 User Privacy

The collection and aggregation of usage data raises a multitude of legal and policy issues which became apparent in the reported development and evaluation. The foremost issue is that of user identification which has acquired relevance in light of the recent demands placed on major search engines for reporting user actions. Although the proposed architecture allows extensive user and institutional data to be represented, this is not a requirement. Measures of user identity protection can be adopted both on the intra- and inter-institutional level, and accommodated by the proposed architecture. In particular, the use of anonymous, random user (or session) IDs to replace IP addresses has been explored. In addition, modifications to the SFX linking server have been proposed to allow the use of such anonymous, session IDs. Future research will need to focus on the definition of approaches to further reduce the exposure of sensitive user- and institution related information.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Mapping of usage data to the ContextObject data structure

| Entity | Mapped usage data |
|---|---|
| Referent | Item used, e.g. journal article |
| ReferringEntity | Entity that referenced the Referent |
| Requester | User identification |
| ServiceType | Type of usage, e.g. "full-text request" |
| Resolver | Linking server |
| Referrer | Information system that generated the ContextObject, i.e., the system that the user was navigating when issuing a service request to the linking server |

TABLE 2

Abbreviated sample demonstrating the representation of usage data as OpenURL ContextObjects

```xml
<?xml version="1.0" encoding="UTF-8" ?>
<ctx:context-object
        timestamp="2005-11-11T17:45:08Z"                                    <!-- event date and time -->
        identifier="urn:UUID:58f202ac-22cf-11d1-b12d-002035b29062">   <!-- global event ID -->
<ctx:referent>                                                              <!-- referent data -->
        <ctx:identifier>info:doi/10.1016/j.ipm.2005.03.024</ctx:identifier>
<!-- referent identifier -->
        <ctx:metadata-by-val>                                               <!-- referent metadata -->
                <ctx:format>info:ofi/fmt:xml:xsd:journal</ctx:format>
                <ctx:metadata>
                    <jou:journal>
                        <jou:atitle>Toward alternative metrics of journal impact</jou:atitle>
                        <jou:jtitle>Information Processing and Management</jou:jtitle> ...
        </ctx:metadata>
    </ctx:referent>
...
        <ctx:requester>                                                     <!-- requester ID -->
                <ctx:identifier>urn:ip:63.236.2.100</ctx:identifier>
        </ctx:requester>
...
        <ctx:service-type>                                                  <!--- type of request -->
            <ctx:metadata-by-val>                                           <!--- referent metadata -->
                <ctx:format>info:ofi/fmt:xml:xsd:sch_svc</ctx:format>
                    <ctx:metadata>
                        <full-text>yes</full-text> ...
                    </ctx:metadata>
```

TABLE 2-continued

Abbreviated sample demonstrating the representation of usage data as OpenURL ContextObjects

```
        </ctx:service-type>
        <ctx:resolver>                                          <!--- resolver ID -->
                <ctx:identifier>http://sfx.example.org/menu</ctx:identifier>
        </ctx:resolver>
        <ctx:referrer>                                          <!-- referrer ID -->
                <ctx:identifier>info:aid/elsevier.com:scopus</ctx:identifier>
        </ctx:referrer>
</ctx:context-object>
```

TABLE 3

Sample OAI-PMH record containing OpenURL ContextObject

```
<oai:record>
<oai:header>
        <oai:identifier>
urn:UUID:58f202ac-22cf-11d1-b12d-002035b29062
        </identifier>
        <oai:datestamp>
                2005-11-12T21:21:51Z
        </oai:datestamp>
</oai:header>
<oai:metadata>
        <ctx:context-object
        identifier="urn:UUID:58f202ac-22cf-11d1-b12d... "
        timestamp="2005-11-11T17:45:08Z">
                <ctx:referent>
                        <ctx:identifier>
                        info:doi/10.1016/j.ipm.2005.03.024
                        </ctx:identifier>
                        ...
                </ctx:referent>
                ...
        </ctx:context-object>
</oai:metadata>
</oai:record>
```

TABLE 4

Sample of journal usage matrix.

|  |  | 1 | 2 | 3 | 4 | 5 | 6 | 7 | 8 | 9 | 10 |
|---|---|---|---|---|---|---|---|---|---|---|---|
| DISS ABSTR A | 1 | 0 | 0 | 51 | 0 | 0 | 0 | 0 | 0 | 4 | 0 |
| NY TIMES | 2 | 0 | 0 | 6 | 48 | 5 | 0 | 11 | 0 | 0 | 0 |
| DISS ABSTR B | 3 | 47 | 5 | 0 | 0 | 0 | 0 | 0 | 5 | 13 | 5 |
| WALL STREET J | 4 | 0 | 47 | 0 | 0 | 0 | 0 | 0 | 0 | 0 | 0 |
| SCIENCE | 5 | 0 | 6 | 0 | 0 | 0 | 14 | 0 | 0 | 0 | 0 |
| NATURE | 6 | 0 | 0 | 0 | 0 | 14 | 0 | 0 | 0 | 0 | 0 |
| NY TIMES MAG | 7 | 0 | 12 | 0 | 0 | 0 | 0 | 0 | 0 | 0 | 0 |
| DEV PSYCH | 8 | 0 | 0 | 5 | 0 | 0 | 0 | 0 | 0 | 0 | 11 |
| PSYCH REP | 9 | 4 | 0 | 11 | 0 | 0 | 0 | 0 | 0 | 0 | 0 |
| CHILD DEV | 10 | 0 | 0 | 54 | 0 | 0 | 0 | 0 | 10 | 0 | 0 |

TABLE 5

Journal PageRank (PRw) in CalState usage data and 2003 citation Impact Factors (IF03).

| Rank | PRw | IF03 | Journal Title |
|---|---|---|---|
| 1 | 115.388 | 21.455 | JAMA |
| 2 | 102.377 | 29.781 | SCIENCE |
| 3 | 86.040 | 30.979 | NATURE |
| 4 | 63.282 | 3.779 | J AM ACAD CHILD PSY* |
| 5 | 61.474 | 7.157 | AM J PSYCHIAT * |
| 6 | 56.156 | 3.363 | AM J PUBLIC HEALTH * |
| 7 | 55.488 | 34.833 | NEW ENGL J MED |
| 8 | 53.712 | 2.591 | MED SCI SPORT EXER * |
| 9 | 40.17 | 0.998 | J ADV NURS * |
| 10 | 39.123 | 5.692 | AM J CLIN NUTR * |

TABLE 6

Usage-based recommendations for "Circadian rhythms" query.
R. Jones (2004) Circadian rhythms: How time flies.
NAT REV NEUROSCI. 5(11), 826-827

| rank | recommendation |
|---|---|
| 1 | D A Golombek (2004). Signaling in the mammalia. NEUROCHEM INT 45(6), 929-936 |
| 2 | H Okamura (2004). Clock genes in cell clock: Roles, Actions, and Mysteries. J BIOL RHYTHM 19 (5), 388-399 |
| 3 | J C Leloup (2004). Modeling the mammalian circadian clock: Sensitivity analysis . . . J THEOR BIOL 230(4), 541-562 |
| 4 | N Allaman-Pillet. (2004) Circadian regulation of islet genes involved in insulin . . . MOL CELL ENDOC 226(1-2), 59-66 |
| 5 | S Panda (2004). It's all in the timing: Many Clocks, Many Outputs. J BIOL RHYTHM 19(5), 374-387 |
| 6 | M Zatz (2004). You talking to me? J BIOL RHYTHM 19(4), 263-263 |
| 7 | Jadwiga Giebultowicz (2004). Chronobiology: Biological Timekeeping. INT COMP BIOL 44(3), 266 |
| 8 | M. Shermer (2004). None so blind. SCI AM 290(3), 42-42 |
| 9 | H Kobayashi (2004). Effect of feeding on peripheral circadian rhythms . . . GENES CELLS 9(9), 857-864 |
| 10 | R Sitruk-Ware (2004). New progestogens - A review of their effects. DRUG AGING 21(13). 865-883 |

TABLE 7

Usage-based recommendations for "Teaching reading to early language learners" query.
R. Gersten (2003) Teaching reading to early language learners. EDUC LEADERSHIP 60 (7), 44-49

| rank | recommendation |
|---|---|
| 1 | A Thompson (2002). May be we can just be friends. EDUCATIONAL THEORY 52 (3), 327-38 |
| 2 | T Quiroga(2002). Phonological awareness in Spanish. J SCHOOL PSYCHOL 40(1), 85-111 |
| 3 | S Linan-Thompson (2003). Effectiveness of supplemental reading instruction . . . ELEM SCHOOL J 103(3), 221-238 |
| 4 | L Araujo (2002) The literacy development of kindergarten English-language . . . J RES CHILD EDUC 16(2), 232 |
| 5 | L. Morris (2001). Going through a bad spell: what young ESL learners . . . CAN MOD LANG REV 58(2), 273-286 |
| 6 | S O Dahlgren (1996). Theory of mind in non-retarded children . . . J CHILD PSYCHOL PSYCH 37(6), 759-763 |
| 7 | E G Cohen (2002). Can groups learn? TEACH COLL REC 104(6), 1045-1068 |
| 8 | D Freeman (2000). Meeting the needs of English language learners. TALKING POINTS 12 (1), 2-7 |
| 9 | Z Lin (2002). Discovering EFL learner's perception of prior knowledge and its roles . . . J RES READ 25(2), 172-90 |
| 10 | K HUIE (2003). Learning to write in the Primary Grades: Experiences of . . . TESOL JOURNAL 12(1), 25-31 |

What is claimed is:

1. A method of determining a rating factor for an item, comprising:

aggregating usage data from transactions performed by users from research institutions worldwide for the item;

applying social network metrics to the aggregated usage data to create a set of impact indicators which are used to determine a rating factor;

providing the rating factor to a user;

wherein the usage data includes one or more variables about a usage event;

wherein said rating factor is a representation of usage of the item; and wherein said rating factor is a measure of status or impact of the item.

2. A method of analyzing usage information for a collection of items, comprising:

aggregating usage information comprising transactions involving items performed by users and captured through a large-scale aggregation of item usage data to produce a superlog;

deriving a network representation of said superlog by representing each item as a node on a network and analyzing the usage information to derive relationships between nodes;

computing network metrics based on said network representation that are indicators of the quality, impact, or status of items in the reference collection;

obtaining a result for any single item in the collection, any groups of items in the collection, or the collection as a whole; and displaying said result, wherein said result consists of the computed metric for any single item in the collection, any groups of items in the collection, and the collection as a whole.

3. A method as recited in claim 2, wherein said network metrics comprise social network metrics.

4. A method as recited in claim 3, wherein said social network metrics provide indicators of status of said nodes in said network representation.

5. A method as recited in claim 4, wherein said indicators comprise degree centrality of a node, closeness centrality of a node, and betweenness centrality of a node.

* * * * *